US009869996B2

(12) United States Patent
Patel et al.

(10) Patent No.: US 9,869,996 B2
(45) Date of Patent: Jan. 16, 2018

(54) SYSTEM AND METHOD FOR USING AN INTERNET OF THINGS NETWORK FOR MANAGING FACTORY PRODUCTION

(71) Applicant: The Boeing Company, Huntington Beach, CA (US)

(72) Inventors: Depti Patel, Agoura Hills, CA (US); Robert J. Rencher, Normandy Park, WA (US); Luis A. Vinuelas, Scottsdale, AZ (US); Roland N. Freeman, Bremerton, WA (US); David W. Nelson, Maple Valley, WA (US)

(73) Assignee: THE BOEING COMPANY, Chicago, IL (US)

( * ) Notice: Subject to any disclaimer, the term of this patent is extended or adjusted under 35 U.S.C. 154(b) by 406 days.

(21) Appl. No.: 14/592,289

(22) Filed: Jan. 8, 2015

(65) Prior Publication Data

US 2016/0202692 A1 Jul. 14, 2016

(51) Int. Cl.
*G05B 19/418* (2006.01)
*G06Q 10/06* (2012.01)

(52) U.S. Cl.
CPC ....... *G05B 19/41875* (2013.01); *G06Q 10/06* (2013.01); *G05B 2219/32368* (2013.01); *G05B 2219/45067* (2013.01)

(58) Field of Classification Search
CPC .......... G06Q 10/06; G05B 2219/32368; G05B 2219/45067
See application file for complete search history.

(56) References Cited

U.S. PATENT DOCUMENTS

| 6,855,099 | B2 | 2/2005 | Hazlehurst et al. |
| 7,063,256 | B2 * | 6/2006 | Anderson ............... B07C 7/005 235/385 |
| 7,126,558 | B1 * | 10/2006 | Dempski .............. G02B 27/017 345/8 |

(Continued)

OTHER PUBLICATIONS

Airbus Group—Factory of the future, Aug. 15, 2014, http://web.archive.org/web/20140815092239/http://www.airbusgroup.com/int/en/story-overview/factory-of-the-future.html.*

(Continued)

*Primary Examiner* — Mark A Connolly
(74) *Attorney, Agent, or Firm* — MH2 Technology Law Group LLP

(57) ABSTRACT

An Internet of things (IoT) network for managing assembly of a multi-part product in a production environment. A user wears a device that provides a hands-free display of assembly instructions while the user is assembling the product. The user also wears sensors for transmitting data about the user's location within the production environment. Point of assembly sensors are disposed at locations within the production environment for transmitting data regarding where the product is and should be assembled. The product's parts also include sensors that transmit data regarding location of the parts and how they are assembled. A backend computer system stores product assembly information including the assembly instructions, where the user should be to assemble the product, how the product should be assembled, and verification of assembly accuracy. Alerts are generated if information from the sensors does not corresponding with the preprogrammed information in the computer system.

15 Claims, 6 Drawing Sheets

(56) References Cited

U.S. PATENT DOCUMENTS

| | | | | |
|---|---|---|---|---|
| 7,433,648 B2* | 10/2008 | Bridgelall | ............. | H01Q 1/007 340/506 |
| 7,580,769 B2 | 8/2009 | Bowman et al. | | |
| 2002/0046368 A1* | 4/2002 | Friedrich | ............. | G05B 19/409 714/45 |
| 2006/0224459 A1* | 10/2006 | Aramaki | ............. | G01G 19/414 705/22 |
| 2009/0158577 A1* | 6/2009 | Schweikle | ............ | B23P 21/002 29/428 |
| 2013/0233922 A1* | 9/2013 | Schoening | ........... | G06Q 10/087 235/385 |
| 2014/0354529 A1 | 12/2014 | Laughlin et al. | | |

OTHER PUBLICATIONS

Lucic Kristijan, BMW Uses Google Glass on Company's Vehicle Production Lines, Nov. 25, 2014, https://www.androidheadlines.com/2014/11/bmw-uses-google-glass-companys-vehicle-production-lines.html.*

European Search Report dated May 6, 2016 for corresponding European Application No. 15 202 723.1, 8 pages.

Ockerman et. al., "Preliminary Investigation of Wearable Computers for Task Guidance in Aircraft Inspection," Wearable Computers, 1998, Digest of Papers, Second International Symposium on, Pittsburgh, PA, IEEE, 8 pages.

* cited by examiner

SYSTEM AND METHOD FOR USING AN INTERNET OF THINGS NETWORK FOR MANAGING FACTORY PRODUCTION

TECHNOLOGICAL FIELD

The present disclosure relates generally to the Internet of Things and, in particular, to an Internet of Things network for efficiently managing a production line in a factory environment.

BACKGROUND

Manufacturing plants for large scale apparatuses, such as aircraft, are composed of multiple production lines and each line may involve the mating of hundreds of thousands of parts. Various systems and methods currently exist for managing production lines and the plurality of zones therein. In one example, a technician who is tasked with mating parts in a particular zone may have to complete a number of time-intensive steps both before and after actually mating the parts to complete the task. The process may begin with the technician receiving security clearance for work in the particular zone, followed by the technician downloading from a workstation instructions for mating the parts at hand. In some instances, the technician has to mentally synthesize the instructions and then walk over to the point on the production line for actually mating the parts, which increases the likelihood of human error and wastes time in the technician walking back and forth between the point of assembly and the location of the corresponding instructions and drawings. Additionally, if there is an issue with the mating process which the technician is unable to resolve, the technician has to call over an engineer with a higher level of expertise, which consumes additional time. After the parts are mated, the technician has to return to the workstation to confirm the successful mating of the parts and perform preconfigured quality assessments thereon.

Given the fast pace of production environments, and the need for maximizing both efficiency and accuracy, it may be desirable to have a system and method that more efficiently and accurately manage a production line.

BRIEF SUMMARY

In view of the foregoing background, example implementations of the present disclosure provide a system, method, and computer-readable storage medium for managing assembly of a multi-part product in a production environment. In this regard, example implementations may include a point of use wearable device that provides a hands-free display to a user who assembles the product within the production environment, at least one wearable sensor disposed on or about the user's body, at least one point of assembly sensor disposed in least one predetermined location within the production environment, and at least one part sensor disposed on at least one of the parts of the product. The system further includes at least one computer having at least one central processing unit (CPU) and at least one memory, the memory including product assembly information such as instructional images pertaining to assembly of the product, information regarding where the product should be assembled in the production environment, information regarding verification of whether the product has been properly assembled, and product assembly records. The point of use wearable device, wearable sensor, point of assembly sensor, part sensor, and computer are connected via a network such as of the Internet, a wireless local area network, and Ethernet network, or an intranet.

In some examples, the computer authenticates the user's location within the production environment based on data from the wearable sensor and the product assembly information, and the computer transmits the instructional images to the point of use wearable device. The user is able to view the instructional images in the point of use wearable device while assembling the product. The computer also authenticates where the product is assembled based on data from the point of assembly sensor and authenticates whether the product is properly assembled based on data from the part sensor and the product assembly information.

In some examples, a 3D printer is connected to the network for making part or a prototype of a part for the product. The wearable sensor may be disposed on the user's clothing or is a part of the point of use wearable device. The instructional images may include technical drawings, three dimensional drawings, photographs, videos, and text. The point of use wearable device may be glasses or a headset. Additionally, the point of use wearable device may include a camera for recording photographs and video of assembly of the product.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
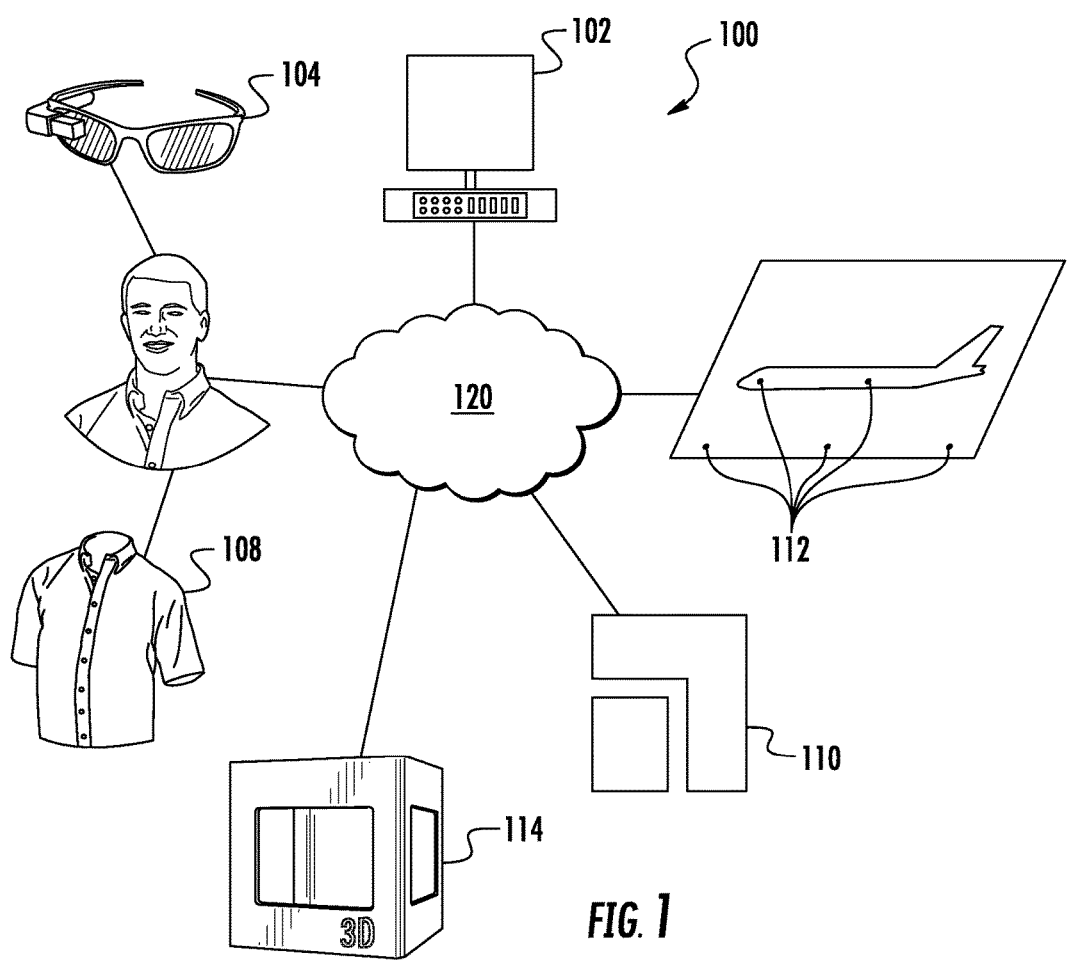
FIG. 1 illustrates a system comprised of an IoT network for managing a production line in a factory environment in accordance with an example implementation of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally to use of an Internet of Things (IoT) network for more efficiently and accurately managing a production line including the design, build, and testing phases therein. The Internet of Things (IoT) is the interconnection of uniquely identifiable computing devices within the existing Internet infrastructure. Such computing devices may be in the form of sensors and actuators, for example, which are linked through wired and wireless networks via the Internet. Example implementations of the present disclosure will be primarily described in conjunction with aerospace applications. It should be understood, however, that example implementations may be utilized in conjunction with a variety of other applications, both in the aerospace industry and outside of the aerospace industry.

Referring now to FIG. 1, a system 100 for using the IoT network 120 to integrate work pieces on a factory floor is illustrated according to example implementations of the present disclosure. For example, the system 100 may comprise one or more backend computing devices 102 (also referred to herein as a backend system 102), including a processor and memory for storing a number of databases, as explained in more detail below. Such databases may include information such as technical drawings, three dimensional drawings, photographs, videos, and text-based instructions for mating system and subsystem parts 110 of an aircraft at different points on a production line.

A technician on the factory line may be equipped with a known point of use wearable device 104, such as Google® glasses or Golden-I® wearable headsets. Such wearable devices 104 enable the technician, for example, to download from backend system 102 and view on the display screen of the wearable device 104 drawings and instructions pertaining to the technician's mating task. The wearable device 104 may be operated by voice commands and head movements, and may include a video camera and a customizable interface. The technician on the factory line may be further equipped with one or more integrated circuit sensors 108 that may be disposed on the uniform or clothing of the technician for detecting his or her location and position. In some examples, the technician's wearable sensor 108 may be integrated with the point of use wearable device 104. Similarly, integrated circuit sensors 112 may be disposed throughout the factory, such as in particular zones and in specific locations within such zones, which are referred to herein as point of assembly sensors 112. For example, within a particular zone, point of assembly sensors 112 may be dispersed at various locations on the factory floor and on the aircraft itself. In addition to transmitting data regarding the location of product assembly, point of assembly sensors 112 may transmit data regarding the status of the environment at the point of assembly. Sensors 110 may be further disposed on the plethora of parts that must be mated at particular points on the factory line. Sensors 104, 108, 110, and 112 are collectively referred to herein as "system sensors."

In an example implementation of the present disclosure, the foregoing components of the system 100, including the backend system 102, wearable device 104, wearable sensors 108, and parts sensors 110, and point of assembly sensors 112, are interconnected within a global computer network, thereby forming the IoT network 120. System 100 may also include a 3-D printer 114, also forming part of the IoT network 120. It should be understood that, in example implementations of the present disclosure, communication within the IoT network may be configured as the Internet, a wireless local area network, an Ethernet network, and/or an intranet.

Figure 2:
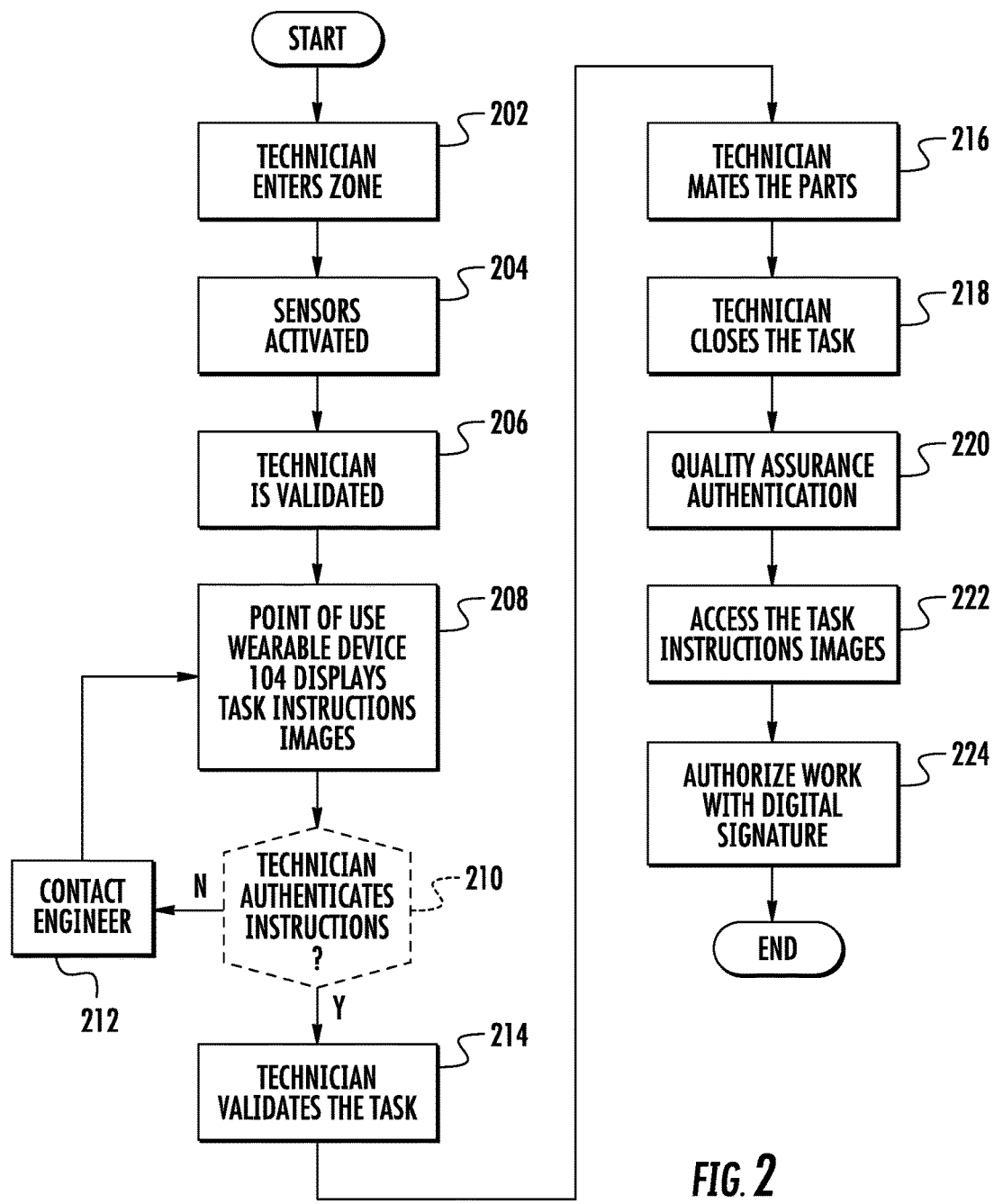
FIG. 2 is flowchart including various steps in a method of using the IoT network in a factory environment accordance with an example implementation of the present disclosure.

FIG. 2 illustrates a method 200 of using the system 100 according to example implementations of the present disclosure. As shown at block 202, the method may include the step of the technician entering into a predefined zone on the factory floor within which the technician has been assigned to perform a particular task or series of tasks. The predefined zone may be a secure or restricted area. The predefined zone parameters may be stored in the backend system 102 of the IoT network 120.

As shown in block 204, when the technician enters an assigned zone on the factory floor, the technician's wearable sensors 108 are activated and establish communication with the backend computing device 102 to validate the technician's presence within the zone, the timing of the technician's presence within the zone based on the a master production schedule, the technician's access to the network, and the technician's level of access to certain data within the network. For example, if the technician's location is not authenticated by computing device 102, data may be prohibited or instructional images may be prevented from being transmitted to or displayed by wearable device 104. As shown in blocks 206 and 208, once the technician receives location and network validation, he or she may receive images (e.g., text instructions, three dimensional drawings, photographs, and videos) via the display screen of the wearable device 104 that pertain to the designated task, such as the mating of multiple aircraft parts. Once the technician has reviewed the instructions and images, he or she may authenticate his or her understanding of the task to be performed and the corresponding instructions, as shown in block 210. If no such authentication is provided, the technician may request assistance from a higher level engineer and/or may request replacement or supplemental instructions, as shown in block 212. On the other hand, if the technician authenticates the instructions and images for the task at hand (block 210), the technician validates the task (block 214), and commences performance of the task (block 216), such as by mating the specified parts. The technician's hands are free to perform the task, and he or she is able to move about the zone as needed, all while viewing the task instructions and images on the wearable device 104.

Upon completion of the designated task, the technician may close out the task, as shown in block 218, to commence the quality assurance analysis, as referenced in block 220. A supervisor or engineer, for example, may access the task instructions and images from the backend system 102 (block 222), and compare them to the mated parts. The data on the mated parts may originate from parts sensors 110 and point of assembly sensors 112. The supervisor may also verify the environmental parameters in which the parts were mated based on data from the point of assembly sensors 112. Additionally, the technician's wearable device 104 may have uploaded photographs and/or video of the mated parts to the backend system 102 which can be accessed by the quality reviewer for comparison to the task instructions and drawings. In one implementation of the present disclosure, if the quality reviewer detects a problem the quality reviewer may communicate with technician while on the factory floor via the technician's wearable device 104. In another implementation of the present invention, if a modification is needed for a part, the technician and/or higher level engineer is able to communicate instructions to a 3D printer 114 within the zone to produce modified parts on site. In various implementations, 3D data and instructions from the backend system may be communicated to the 3D printer 114 to make an actual part or prototype part during performance of the designated task. When the quality reviewer is satisfied with the performance of the task, the reviewer approves the technician's work, such as with a digital signature, as shown in block 224.

Figure 3:
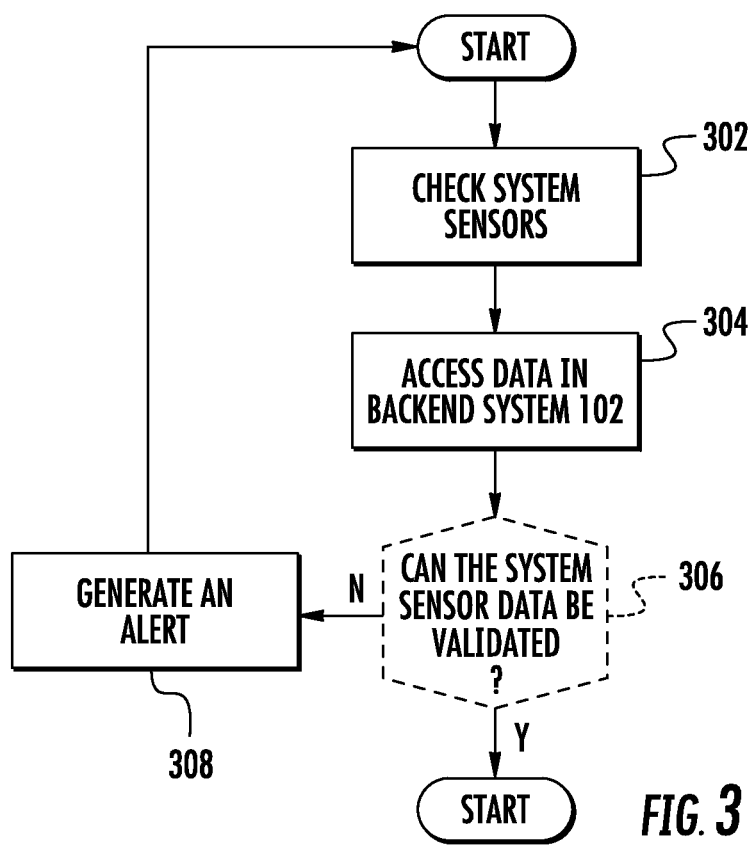
FIG. 3 is a flowchart including various steps in a method of using the IoT network in a factory environment in accordance with an example implementation of the present disclosure.

Concurrently with the technician initiated interactions recited above with respect to FIG. 2, the backend system 102 actively performs system 100 checks within the IoT network 120 to ensure accurate and efficient performance of tasks by the technician. Specifically, as shown in block 302 of FIG. 3, when data is received from the system sensors, such as data identifying technician location and/or position (sensors 108), parts location and/or configuration (sensors 110), or point of assembly location (sensors 112), the system 100 accesses the corresponding data in the backend system 102, as shown in block 304, to determine whether the system sensor data can be validated. Examples of information that may be stored in the backend system 102 include information pertaining to factory status, tooling systems, compliance systems, regulatory systems, assembly records, environmental conditions, material constraints, and the like. As shown in block 306, if the system sensor data matches the data in the backend system 102, the system 100 validates the sensor data and moves on to similarly process the next slice of incoming system sensor data. However, if any point of time the system sensor data does not match the data in the backend system 102, an alert is generated, as shown in block 308. There are could be an infinite number scenarios that could trigger an alert according to implementations of the present disclosure including, without limitation, when a technician is not in a designated zone, when all of the parts needed for a particular kit are not within close enough proximity of one another, when a kit of parts to be assembled is not in the correct location on the factory floor, when parts are assembled at an incorrect location on the aircraft, and/or when parts have not been correctly assembled. Any system 100 alert may be electronically transmitted to predefined workers such as supervisors and higher level engineers for human oversight and intervention, as needed. In example implementations of the present disclosure, the back end system 102 can be networked via the cloud to other networks relating to various segments of the business including product design, planning, logistics, and quality.

Figure 4:
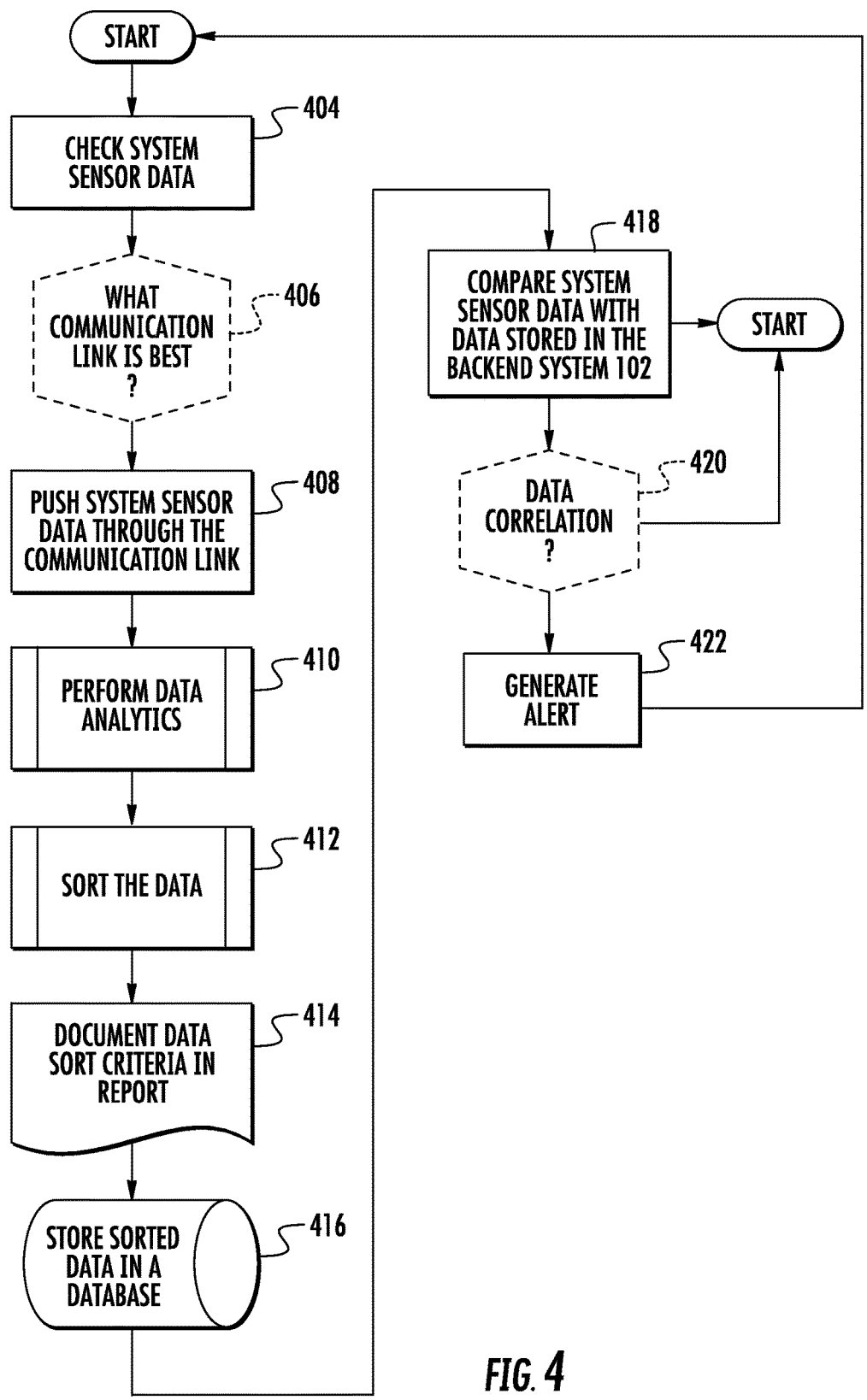
FIG. 4 is a method for processing system sensor data in accordance with an example implementation of the present disclosure.

FIG. 4 illustrates a method for processing system sensor data as generally described above with respect to blocks 302 and 304 in FIG. 3. As shown in block 402, the backend system 102 assesses the number of sensors within a specified zone on the factory floor and checks the system sensor data, as shown in block 404. The backend system 102 selects the optimal type of communication link with the system sensors based on the number of such system sensors and preconfigured policy rules, as shown in block 406. Once the type of communication link has been determined, the link is activated such that data from system sensors is pushed and analytics can be performed on the data, as shown in block 410. The analytics may be based on the rules of the designated zone and the number of system sensors therein. Data sorting, as illustrated in block 412, is based on similar parameters. The sorted data may be output in the form of a report, as illustrated in block 414, and stored in a database, as illustrated in block 416. The data may be stored in the database as unstructured data, structured data, or any suitable format for further analysis. The backend system 102 is then able to make rules-based decisions by comparing the system sensor data with the preconfigured data stored in the backend system 102, as shown in block 418. If there is a lack of correlation between the system sensor data and the preconfigured data stored in the backend system 102 (block 420), an alert is triggered, as shown in block 422 and as described above.

According the example implementations of the present disclosure, the IoT network 120 provides factories with increased opportunity for more efficient and accurate production resulting from the IoT network's 120 provision of a repeatable approach to aggregating work instructions at various levels and production lifecycles. Additional benefits include optimization in both human and non-human resources (e.g, parts and supplies), as well as enhanced production line planning. Because the IoT network 120 of the present disclosure is configured to capture and monitor the tasks being performed, opportunities for quality review and training are also significantly enhanced. Significant cost savings can be derived from faster and more accurate production.

According to example implementations of the present disclosure, the various components of the system 100, including system sensors and back end system 102, may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the system 100 and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the backend system 102 of the present disclosure may include one or more of a number of components such as a processor (e.g., processor unit) connected to a memory (e.g, storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the backend system 102. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 5:
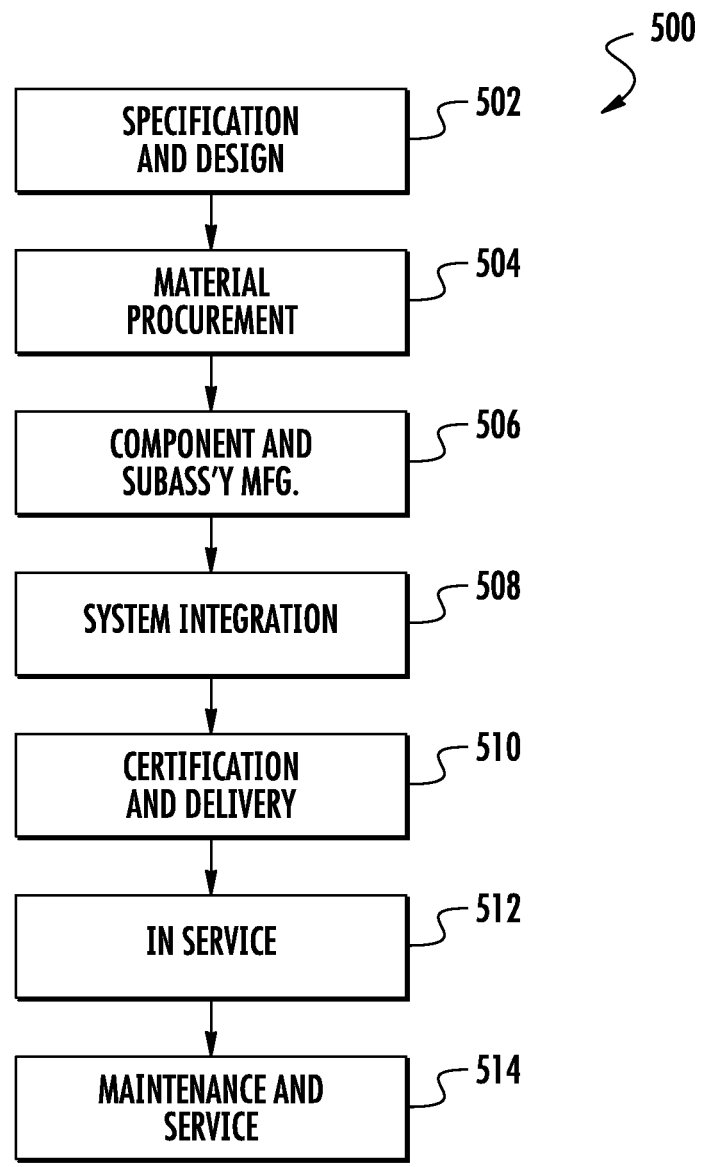
FIG. 5 is a block diagram of aircraft production and service methodology.
Figure 6:
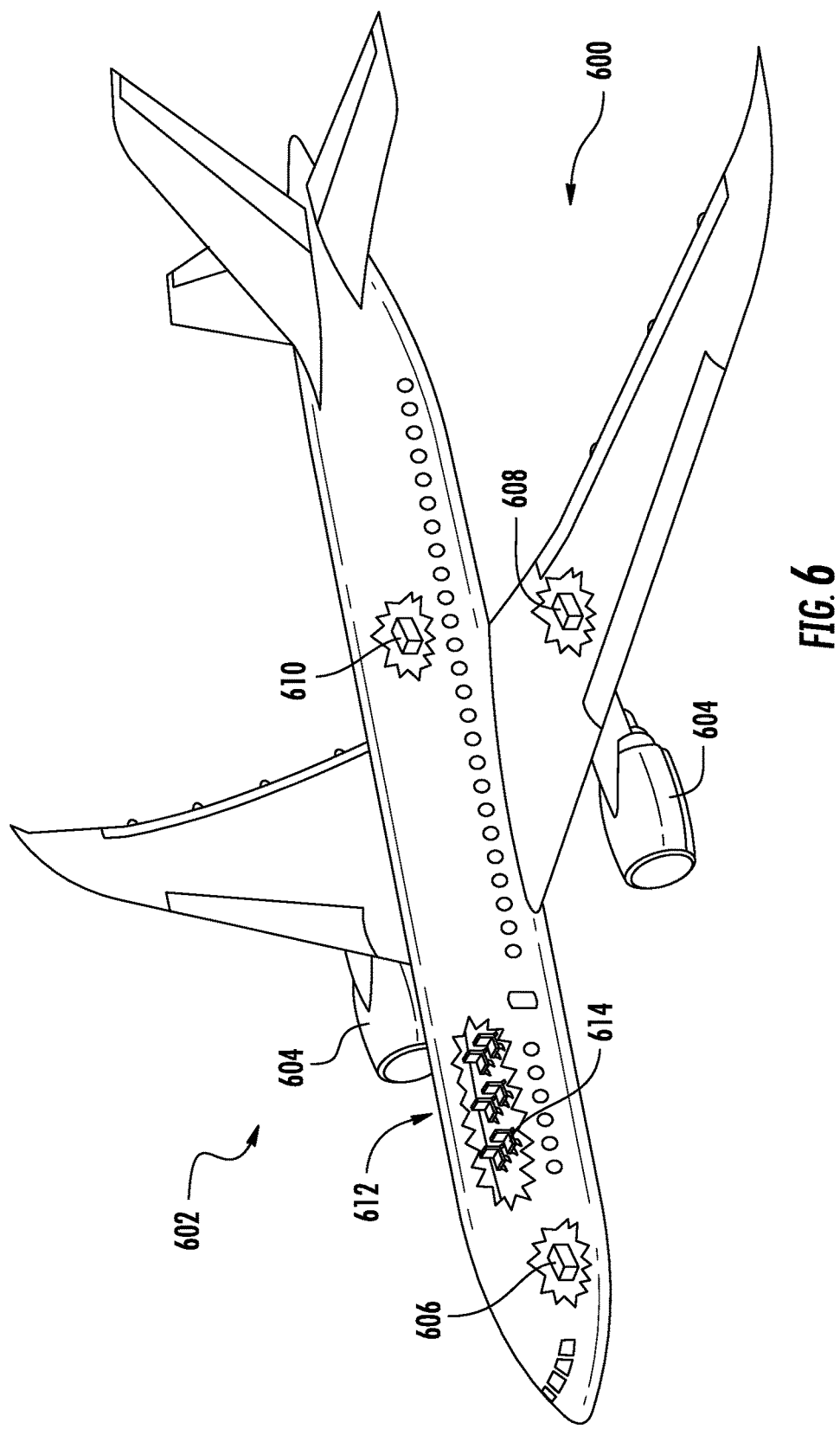
FIG. 6 is a schematic illustration of an aircraft.

As referenced above, examples of the present disclosure may be described in the context of aircraft manufacturing and service. As shown in FIGS. 5 and 6, during pre-production, illustrative method 500 may include specification and design (block 502) of aircraft 602 and material procurement (block 504). During production, component and subassembly manufacturing (block 506) and system integration (block 508) of aircraft 602 may take place. Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc. of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for managing assembly of a multi-part product in a production environment comprising:
   at least one wearable sensor disposed on or about a user's body;
   at least one point of assembly sensor disposed in at least one predetermined location within the production environment;
   at least one part sensor disposed on at least one of the parts of the product;
   a device; and
   at least one computer, wherein the at least one wearable sensor, the at least one point of assembly sensor, the at least one part sensor, the device, and the at least one computer are connected via a network, and wherein the at least one computer comprises at least one central processing unit (CPU) and at least one memory having computer readable program code portions stored therein that when executed by the at least one processing unit, cause the computer to at least:
   authenticate the user's location within the production environment based on data from the wearable sensor and product assembly information;
   authenticate where the product is assembled based on data from the point of assembly sensor;
   authenticate whether the product is properly assembled based on data from the part sensor and the product assembly information; and
   transmit instructional data regarding assembly of the product to the device when the user's location is authenticated by the at least one computer.

2. The system of claim 1 wherein the device comprises a wearable device comprising a hands-free display and wherein the instructional data comprises instructional images regarding assembly of the product.

3. The system of claim 2 wherein the wearable sensor is disposed on the user's clothing or is a part of the wearable device.

4. The system of claim 2 wherein the wearable device is a device selected from the group consisting of glasses and headsets.

5. The system of claim 2 wherein the wearable device comprises a camera for recording photographs and video of assembly of the product.

6. The system of claim 2 wherein if the user's location is not authenticated by the at least one computer, the instructional images are not transmitted to the wearable device for display to the user.

7. The system of claim 1 further comprising a 3D printer that is connected to the network for making a part or a prototype of a part for the product.

8. The system of claim 1 wherein the network is selected from the group consisting of the Internet, a wireless local area network, an Ethernet network, and an intranet.

9. A method for managing assembly of a multi-part product in a production environment comprising the steps of:
   a computer authenticating a user's location within the production environment based on data from at least one wearable sensor disposed on or about the user's body;
   the computer authenticating where the product is assembled based on data from at least one point of assembly sensor disposed in at least one predetermined location within the production environment;
   the computer authenticating proper assembly of the product based on data from at least one part sensor disposed on at least one of the parts of the product;
   the computer transmitting instructional images pertaining to assembly of the product to a wearable device comprising a hands-free display when the user's location is authenticated by the computer, wherein the instructional images are prohibited from being displayed on the device when the user's location is not authenticated by the computer,
   wherein the wearable sensor, the at least one point of assembly sensor, the at least one part sensor, the computer, and the device are connected via a network.

10. The method of claim 9 further comprising the step of the computer providing instructions to a 3D printer for making a part or a prototype of a part for the product.

11. The method of claim 9 wherein the instructional images are selected from the group consisting of technical drawings, three dimensional drawings, photographs, videos, and text.

12. The method of claim 9 further comprising the step of the wearable device recording photographs and video of assembly of the product.

13. The method of claim 9 further comprising the step of the computer generating an alert if the product is assembled at a location other than the predetermined location.

14. The method of claim 9 further comprising the step of the computer generating an alert if product is improperly assembled.

15. A computer-readable storage medium for managing assembly of a multi-part product in a production environment, the computer-readable storage medium being non-transitory and having computer readable program code portions stored therein that, in response to execution by one or more central processing units (CPUs) and or more additional CPUs, cause a computer system to at least:
- authenticate a user's location within a production environment based on data from at least one wearable sensor disposed on or about the user's body, wherein the at least one wearable sensor comprises a hands-free display;
- transmit, to a wearable device for display thereon, instructional images pertaining to instructions for assembly of the product when the user's location is authenticated;
- authenticate a location within the production environment where the product is assembled based on data from at least one point of assembly sensor disposed in at least one predetermined location within the production environment; and
- authenticate proper assembly of the product based on data from at least one part sensor disposed on at least one of the parts of the product,
- wherein the computer system, the at least one wearable sensor, the wearable device, the at least one point of assembly sensor, the at least one part sensor are connected via a network.

* * * * *